US009173092B1

(12) United States Patent  (10) Patent No.: US 9,173,092 B1
Hohpe  (45) Date of Patent: Oct. 27, 2015

(54) BASE STATION DATA EMBEDDED FOR TRANSMISSION WITHIN INFORMATION PROVIDED TO A USER DEVICE

(75) Inventor: Gregor Hohpe, San Francisco, CA (US)

(73) Assignee: Google Inc., Mountain View, CA (US)

( * ) Notice: Subject to any disclaimer, the term of this patent is extended or adjusted under 35 U.S.C. 154(b) by 111 days.

(21) Appl. No.: 13/473,255

(22) Filed: May 16, 2012

Related U.S. Application Data

(60) Provisional application No. 61/566,592, filed on Dec. 2, 2011.

(51) Int. Cl.
| H04B 5/00 | (2006.01) |
| H04W 12/02 | (2009.01) |
| H04W 4/12 | (2009.01) |
| H04W 4/00 | (2009.01) |
| H04W 88/02 | (2009.01) |

(52) U.S. Cl.
CPC .............. *H04W 12/02* (2013.01); *H04W 4/008* (2013.01); *H04W 4/12* (2013.01); *H04W 88/02* (2013.01)

(58) Field of Classification Search
CPC ....... H04W 4/008; H04W 4/12; H04W 12/02; H04W 88/00; H04W 88/02
USPC .......... 455/41.1, 41.2, 411, 414.4, 556.2, 557
See application file for complete search history.

(56) References Cited

U.S. PATENT DOCUMENTS

| 6,957,213 | B1 * | 10/2005 | Yuret ............................ 707/711 |
| 7,437,419 | B2 * | 10/2008 | Tu et al. ........................ 709/206 |
| 7,739,295 | B1 * | 6/2010 | Agrawal et al. ............... 707/768 |
| 8,065,290 | B2 * | 11/2011 | Hogue .......................... 707/706 |
| 8,108,144 | B2 * | 1/2012 | Forstall et al. ................ 701/426 |
| 8,122,026 | B1 * | 2/2012 | Laroco et al. ................. 707/737 |
| 8,311,845 | B2 * | 11/2012 | Vengroff et al. ............... 705/1.1 |
| 8,347,202 | B1 * | 1/2013 | Vespe et al. ................... 715/200 |
| 8,352,980 | B2 * | 1/2013 | Howcroft ........................ 725/34 |
| 8,364,782 | B2 * | 1/2013 | Couvreur ...................... 709/218 |
| 8,401,468 | B2 * | 3/2013 | Helvick ....................... 455/41.1 |
| 8,584,031 | B2 * | 11/2013 | Moore et al. .................. 715/773 |
| 8,606,861 | B2 * | 12/2013 | Tu et al. ........................ 709/206 |
| 8,612,472 | B2 * | 12/2013 | Kenthapadi et al. .......... 707/769 |
| 2008/0270542 | A1 * | 10/2008 | Tu et al. ........................ 709/206 |
| 2012/0245995 | A1 * | 9/2012 | Chawla ...................... 705/14.45 |

* cited by examiner

*Primary Examiner* — Marceau Milord
(74) *Attorney, Agent, or Firm* — Armstrong Teasdale LLP

(57) ABSTRACT

Systems and methods are described herein for collecting data from a base station. Data may be collected at a base station. The data may be embedding into a URL. The URL may then be wirelessly transferring to a mobile device. The mobile device may transmit the URL to a front-end sever. Upon receiving the URL at a front-end server from the mobile device, the URL may be stripped of the embedded data. The stripped URL can be passed from the front-end server to a web server for content delivery to the user device. The front-end server may decode the data stripped from the URL to be stored as collected base station data.

20 Claims, 4 Drawing Sheets

BASE STATION DATA EMBEDDED FOR TRANSMISSION WITHIN INFORMATION PROVIDED TO A USER DEVICE

RELATED APPLICATION

This application claims priority to U.S. Provisional Patent Application No. 61/566,592, filed Dec. 2, 2011 and entitled "Base Station Data Embedded for Transmission within Information Provided to a User Device." The complete disclosure of the above-identified priority application is hereby fully incorporated herein by reference.

TECHNICAL FIELD

The present disclosure relates to systems and methods for enabling a base station to embed parameters into information provided to a user device in such a way that the user device communicates the parameters to another system over a network on behalf of the base station.

BACKGROUND

Digital information systems are deployed in businesses, other facilities, or outdoors to provide information or services to users. A user with a mobile device, smartphone, PDA, or other electronic device may receive information from such a system using their electronic device. Such a system may be a Near Field Communication ("NFC") station. The user's device can be tapped or swiped at the NFC station to wirelessly communicate and receive information. The information provided to the user may include web links, business information, local information, offers, and so forth.

An NFC station may be a small, inexpensive, low-power device. These limitations generally preclude inclusion of network connectivity resources within the NFC station. This is particularly true when the NFC station is deployed on signage, kiosks, storefronts, or other locations away from infrastructure such as electrical power or network access. Direct network connectivity, such as WiFi or cellular data networks, is generally too expensive from both a hardware requirement perspective and an operational expense perspective.

A problem for NFC stations lacking network connectivity is that the NFC station has no way to access or relay information out to other systems. For example, if the NFC station collected information or data, it would not be connected to send the data or information anywhere. Unfortunately, the small volume of such data collected by such a small, low-power base station device generally makes a dedicated communication connection an excessive expense.

SUMMARY

In certain exemplary embodiments, a method for collecting data from a base station includes a computer-based system. Data may be collected at the base station and then encoded. The encoded data may be embedding into a URL. The URL may then be wirelessly transferred to a mobile device. The mobile device may transmit the URL to a front-end sever. Upon receiving the URL at a front-end server from the mobile device, the URL may be stripped of the embedded data. The stripped URL can be passed from the front-end server to a web server for content delivery to the user device. The front-end server may decode the data stripped from the URL and store the data as collected base station data.

These and other aspects, objects, features, and advantages of the exemplary embodiments will become apparent to those having ordinary skill in the art upon consideration of the following detailed description of illustrated exemplary embodiments, which include the best mode of carrying out the invention as presently perceived.

DETAILED DESCRIPTION OF EXEMPLARY EMBODIMENTS

Overview

Figure 1:
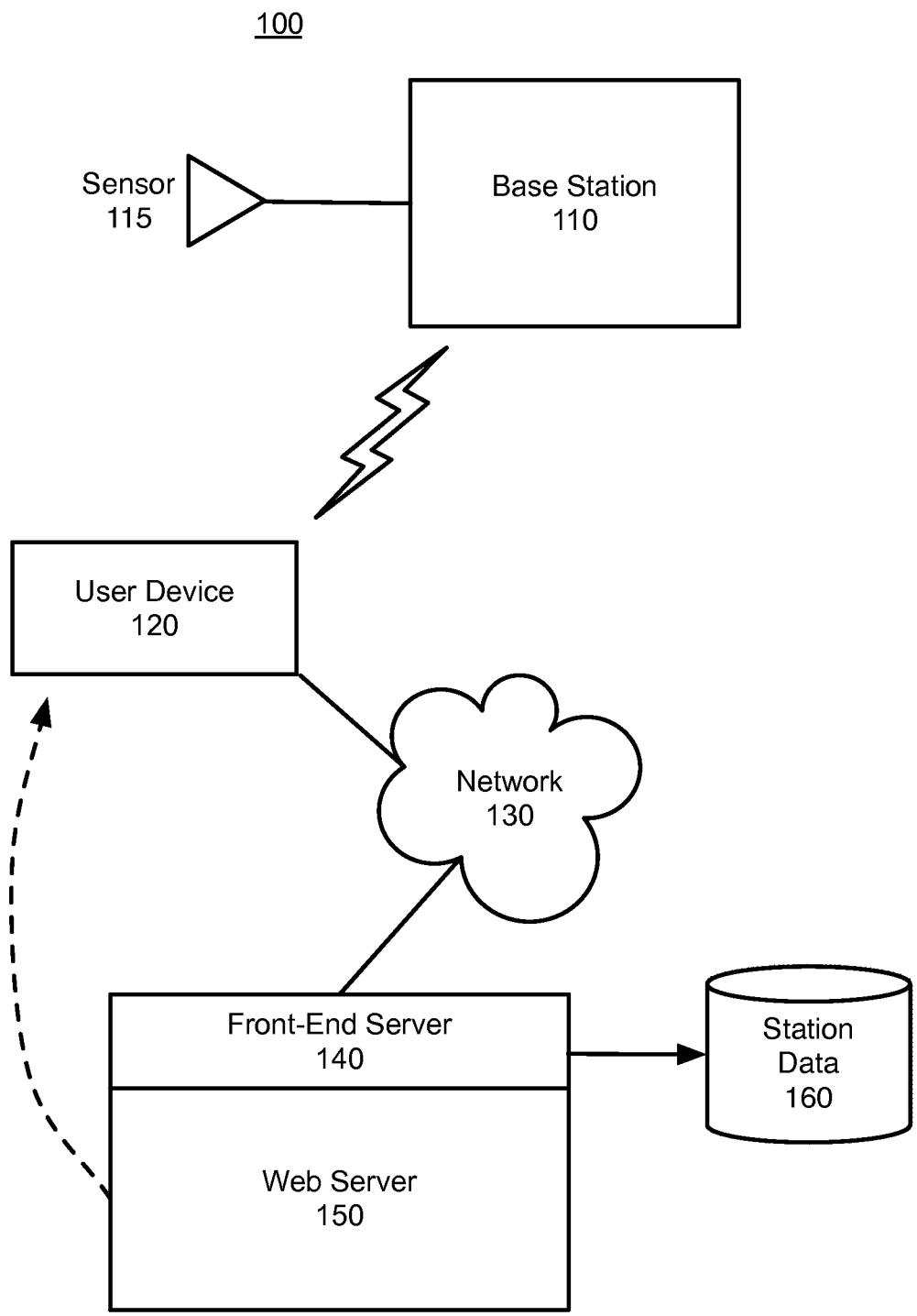
FIG. 1 depicts an operating environment for embedding base station data for transmission with information provided to a user, in accordance with certain exemplary embodiments.

The methods and systems described herein enable a base station to embed parameters onto information provided to a user device in such a way that the user device communicates the parameters to another system on a network on behalf of the base station. For example, the base station can transmit a uniform resource locator ("URL") via NFC to a user device so that the user device may display content associated with the URL within a web browser. As part of this process, additional parameters may be embedded for transfer to a network-connected server without any effect on the user's information retrieval operation.

The additional parameters may be embedded into the URL by the base station. A front-end server associated with the URL can strip off the embedded parameters and store or process the encoded information. The stripped URL can then function as a traditional URL to locate content to be rendered to the user device's browser without impact from the embedded parameters. Thus, data may be transmitted to a server via the front-end without the base station itself engaging in network connectivity. An inexpensive base station without network communication resource can operate on a limited power source such as a battery, fuel cell, capacitor, sunlight, ambient light, electromagnetic energy harvesting, mechanical energy harvesting, or so forth.

The embedded parameters can transfer information from one or more base stations simply from users periodically connecting to the base stations. The incentive to the user can be completely unrelated to the data collection and parameter embedding. For example, the user may arrive at a park and touch their mobile phone to an NFC station to receive a web link for a map of the park or links to nearby restaurants or other businesses. When the user sends the received URL to a server, they may also be uploading embedded parameters from the base station. These embedded parameters may be related to the temperature at the park, the number of accesses to the base station in the last 24 hours, or various other data collected by the base station.

According to some exemplary embodiments, NFC base stations placed outdoors can collect weather data and transmit it whenever a user touches the base station with their device, for example to get a local map or directions. According to some exemplary embodiments, base stations installed in a business can monitor the noise level at different times of day to assess traffic levels or provide recommendations to customers searching for a quiet or lively location. According to some exemplary embodiments, air quality sensors could detect whether a restaurant is smoky or not. Similarly, light sensors could determine operating hours.

When base stations have data to upload but no network connectivity, the base station can use the technology discussed herein to leverage network connectivity of user's devices such as mobile phones, tablets, handheld computers, media players, or so forth. Two example elements to accomplishing this are transmitting the data to the user's device and then encouraging the user to connect to a service via the Internet or other network.

The first example element of transmitting data to the user's device may be accomplished using NFC (Near Field Communication), barcodes, camera images, audio signaling, or any other mechanism for providing information to the user device. An example system can transmit a URL to the user's device to share access to various on-line services. For instance, access to local map information. The user can position their NFC-equipped mobile device on, or very near, such a base station to receive the URL. This event may be referred to as "tapping" the base station or tapping the mobile device to the base station. Additional data, such as from sensors or operating statistics, may be embedded into the URL that is transferred to the user's device.

The second example element of encouraging the user to connect to a service via the Internet or other network may be accomplished by providing the user with a service of value to the user. For example, the base station may provide map links, local search information, links to coupons, or various other information resources. This information may be provided to the user device in such a way as to incentivize the user to use the information to access a network, thus allowing the embedded data to also transmit to the network.

One application example related to the technology discussed herein may involve a base station that collects weather and environmental data using attached sensors. The base station could be configured to provide users with URLs to local maps and directions when the users tap their mobile devices to the base station. The provided URL may include an embedded string representing the environmental data to be uploaded to a server associated with the URL. The data is uploaded to a network-attached server without the base station having a dedicated network connection. The embedded data does not need to affect the service the user receives in any way. The URL merely serves as a transportation mechanism and the embedded data can be separated from the user's URL request on the server side.

The inventive functionality of the invention will be explained in more detail in the following description, read in conjunction with the figures illustrating the program flow.

Turning now to the drawings, in which like numerals indicate like (but not necessarily identical) elements throughout the figures, exemplary embodiments are described in detail.

System Architecture

FIG. 1 depicts an operating environment 100 for embedding base station data for transmission with information provided to a user, in accordance with certain exemplary embodiments. As depicted in FIG. 1, the operating environment 100 includes a base station 110 which may be connected to one or more sensors 115. The base station is configured to provide information to a user via a user device 120. The user device 120 may be a mobile phone or other electronic device associated with the user and connected to one or more networks 130. The user device 120 can receive a link or URL from the base station 110 for retrieving information from a web server 150 over the network 130. The URL provided by the base station 110 can contain additional data or parameters embedded within it by the base station 110. When the user device 120 provides the URL to the web severer 150, the URL may first be received at a front-end server 140 where the embedded data may be stripped off and stored as station data 160.

The base station 110 may be any electronic device capable of providing information to a user device 120. The base station 110 may include a computer processor, software, hardware circuits, or combinations thereof. The base station 110 may be an NFC station capable of communicating with the user device 120 using NFC technology. Alternatively, the base station 110 may be capable of communicating information to the user device 120 using encoded audio, visual mechanisms (such as bar codes, 2-dimensional bar codes, animated bar codes, etc.), optical signals (such as infrared, modulated lasers, etc.), electrical signals, wireless radio frequency ("RF") signals, or any combinations thereof. The base station 110 may be a low-power device configured to operate on a limited power source such as a battery, fuel cell, capacitor, sunlight, ambient light, electromagnetic energy harvesting, mechanical energy harvesting, or so forth. Such an inexpensive base station may operate without having dedicated network communication resources. The base station 110 may be placed in areas where users can access them with a user device 120 to retrieve information such as maps, directions, nearby businesses, menus, reservations, coupons, ticketing information, promotions, warnings, digital keys, passwords, timestamps, or any other such information of possible interest to the user.

The sensors 115 may include light sensors, vibration sensors, sound sensors, cameras, microphones, timestamps, or so forth. The sensors 115 may also include environmental sensors such as temperature, pressure, precipitation, wind-speed, etc. Any number of sensors 115 may be associated with each base station. Each sensor 115 may be sampled at a specified sampling rate. The sampling rates may be synchronized for all sensors 115 or each sampling rate may be unrelated, interleaved, clock-divided, poled, or otherwise related to other sensor sampling rates. Alternatively, each sensor 115 may be triggered to sample by another sensor 115 or by a threshold level of signal associated with the sensor 115. The sampling rates may change with time or day, date, available storage space, or frequency of retrieval by user devices 120. The stored samples may be temporally decimated to recover storage capacity for additional samples if there has been a delay in, or reduced frequency of, retrieval of data by user devices 120.

The user device 120 may be a mobile phone, smart phone, PDA, netbook computer, laptop computer, tablet computer, or any other wired or wireless, processor-driven device. The user device 120 can receive information from the base station 110.

The network 130 may be an internet, the Internet, a LAN, a WAN, wireless 3G, 4G, Wi-Fi, Wi-Max, any other data communication mechanism for providing connectivity to the user device 120, or any combination thereof. The network 130 may be wired, wireless, optical, RF, packet-switched, connection-switched, or any combination thereof. The network 130 may have any topology, or combinations of topologies, and may use any protocols, or combinations of protocols for communicating data from the user device 120. The network 130 may involve wireless carriers, Internet service providers, wireless hot spots, peer-to-peer communications, any other carriers or providers, or any combinations thereof.

The front-end server 140 can receive an information request from the user device 120 over the network 130. At the front-end server 140, the embedded data from the base station 110 can be stripped from the resource identifier provided to the user device 120. For example, a URL may be received at a front-end server 140 where the embedded data may be stripped off. The front-end server 140 may then store the embedded data that was stripped off as station data 160. The front-end server 140 may also provide the stripped URL to the web severer 150. The front-end server 140 can operate without affecting the user's experience of information retrieval from the web server 150.

The web server 150 can receive the stripped URL from the front-end server 140. The stripped URL may then be used in a tradition fashion by the web server 150 to retrieve content and provided it back to the user device 120. The web server 150 may reside on one or more physical computer systems. The web server 150 may reside on the same computer system or network as the front-end server 140, or the web server 150 may reside on different computer systems or even different interconnected networks as the front-end server 140. The front-end server 140 and the web server 150 may be any type of computer systems each including one or more processors, cores, software, firmware, hardware circuits, or any combinations thereof.

The station data 160 may be stored in association with the front-end server 140, the web server 150, or both. Alternatively, the station data 160 may be stored in a separate database system or on a separate computer system or network from the front-end server 140 or the web server 150. The station data 160 may be decrypted, decoded, de-duplicated, compressed, statistically analyzed, or otherwise processed to improve its usefulness or value. The station data 160 may be communicated to other computer systems, businesses, databases, users, or software systems to aggregate, process, digest, display, publish, analyze, manipulate, transform, archive, share, integrate, or otherwise make use of data collected by the base stations 110 and communicated back to become station data 160.

System Process

Figure 2:
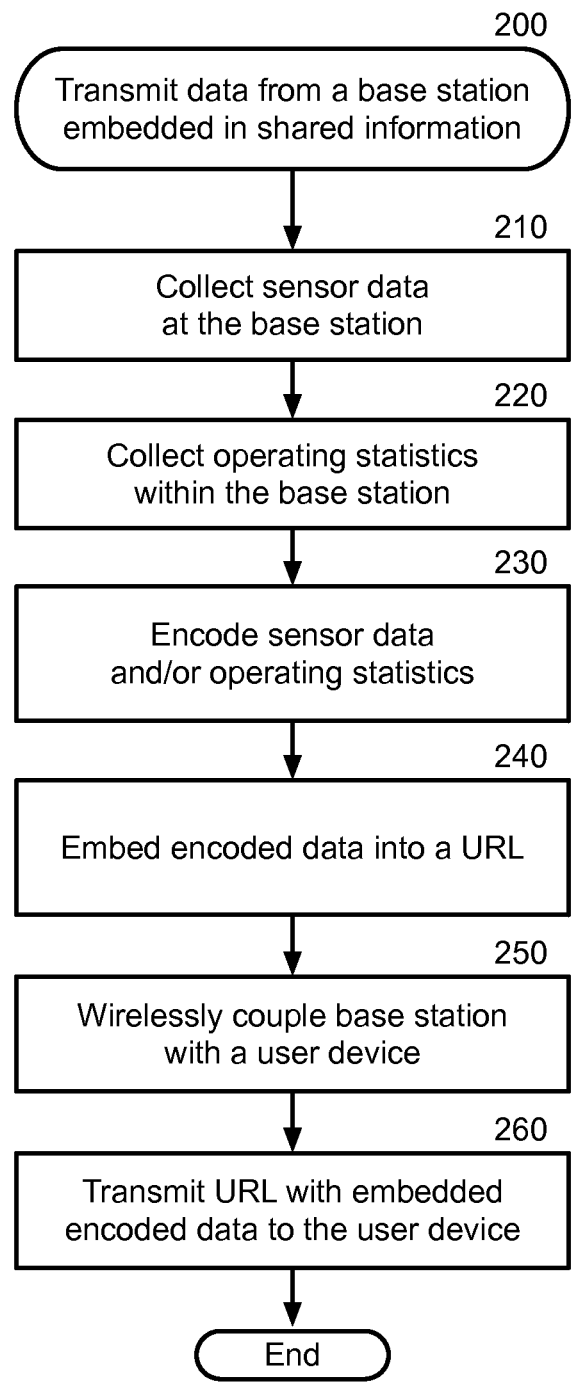
FIG. 2 is a block flow diagram depicting a method for transmitting data from a base station embedded in shared information, in accordance with certain exemplary embodiments.

FIG. 2 is a block flow diagram depicting a method 200 for transmitting data from a base station embedded in shared information, in accordance with certain exemplary embodiments. The method 200 is described with reference to the components illustrated in FIG. 1.

In block 210, sensor data is collected at the base station 110. Sensors 115 may collect sensor data associated with light sensors, vibration sensors, sound sensors, cameras, microphones, timestamps, or so forth. The sensor data may also include environmental sensor data such as temperature, pressure, precipitation, wind-speed, etc. Any number of sensors 115 may be associated with each base station 110. Each sensor 115 may be sampled at a specified sampling rate together with the other sensors 115 or indecently. Inexpensive sensors 115 may be supported without dedicated network resources. Instead of sensors 115 transmitting data directly to a server, they can utilize the connectivity of the user devices 120 as a conduit. Data collected from the sensors 115 can be stored in internal memory associated with the base station 110 until a user device 120 retrieves the data for transmission.

In block 220, operating statistics within the base station 110 may be collected. These statistics may include battery life, firmware versions, hardware versions, time/date stamps, number of accesses from user devices 120, uptime, downtime, sampling rates of sensors, memory usage, and so forth. These operating statistics may be collected for transmission similar to, or in conjunction with, the sensor data collected in block 210.

In block 230, the sensor data and/or operating statistics may be encoded. The encoding may include forming tagged data, encrypting, compressing, converting to text, or so forth. The text conversion may include techniques related to uuencoding, MIME, yEnc, or others. The coding format may be extensible. The coding format may involve protocol buffers ("protobufs") as a way of encoding structured data in an efficient yet extensible format. Similarly, any other container format may be employed. The coding may involve error coding such as error correction, redundancy, or error detection coding. Similarly, data may be repeatedly coded to multiple user devices 120 to mitigate the chance that some data provided to user devices 120 may not make its way through the network 130 to the front-end server 140.

In block 240, the encoded data from block 230 may be embedded into a URL. For example, the data encoded into text may be appended onto the end of the URL. The URL format may support any type of sensor information to be embedded subject to the maximum URL length. This maximum is approximately 200 bytes for some NFC protocols, but may vary depending upon embodiments to various other maximum values including those much larger limits.

Embedding of coded data into the URL may also involve redirection of the URL to the front-end server 140. For example, the URL may be changed to a common address of the front-end sever 140. Since the address of the actual web sever 150 will need to be recovered into the stripped URL at the front-end server 140, it will need to be a known value, encoded into the embedded data of the URL, given as a sub-address, or otherwise provided to the front-end server 140 for recovery.

It should be appreciated that while embedding encoded data into a URL is used as an example throughout this disclosure, the data may also be embedded into, or piggybacked onto, any other information provided to the user of the user device 120 and likely to be transmitted onto the network 130. This may include image embedding, watermarking, coding into provided passwords, audio signals, or so forth.

According to some embodiments, there are benefits to embedding the data within a URL. This is particularly true for mobile user devices 120 incorporating NFC or similar technology. When the user couples the user device 120 to the base station 110, the station can transmit the URL (and embedded data) to the user device 120. The URL may then be automatically provided to a browser by the NFC code or operating system code of the user device 120 for network retrieval and rendering within a browser of the user device 120. This can support nearly automatic uploading of the embedded data without impacting the main use case of retrieving content associated with the URL for rendering within a browser. Other embedding mechanisms may involve additional interactions from the user or even a dedicated application or software to be installed onto the user device 120.

In block 250, a user device 120 can wirelessly couple to the base station 110. According to an embodiment using NFC, coupling and transmission to the user device 120 can over a range on the order of a few centimeters and therefore using relatively low electrical energy. The RF field associated with the NFC may be active for a short amount of time also potentially reducing energy requirements. For example, the field may be active for less than approximately one second. NFC can also support improved security because of the short range and high data bandwidth involved. It should be appreciated that other coupling mechanisms may be used aside from NFC. For example, optical, audio, visual, or other RF techniques may be used to communicate from the base station 110 to the user device 120.

In block 260, the URL with the embedded encoded data may be transmitted to the user device 120 from the base station 110. This transmission may use the communication channel established by the coupling in block 250. The communication channel may be NFC or any other communication mechanisms.

After block 260, the method 200 ends. Of course, the user device can continue to access repeated or different information services from the base station 110.

Figure 3:
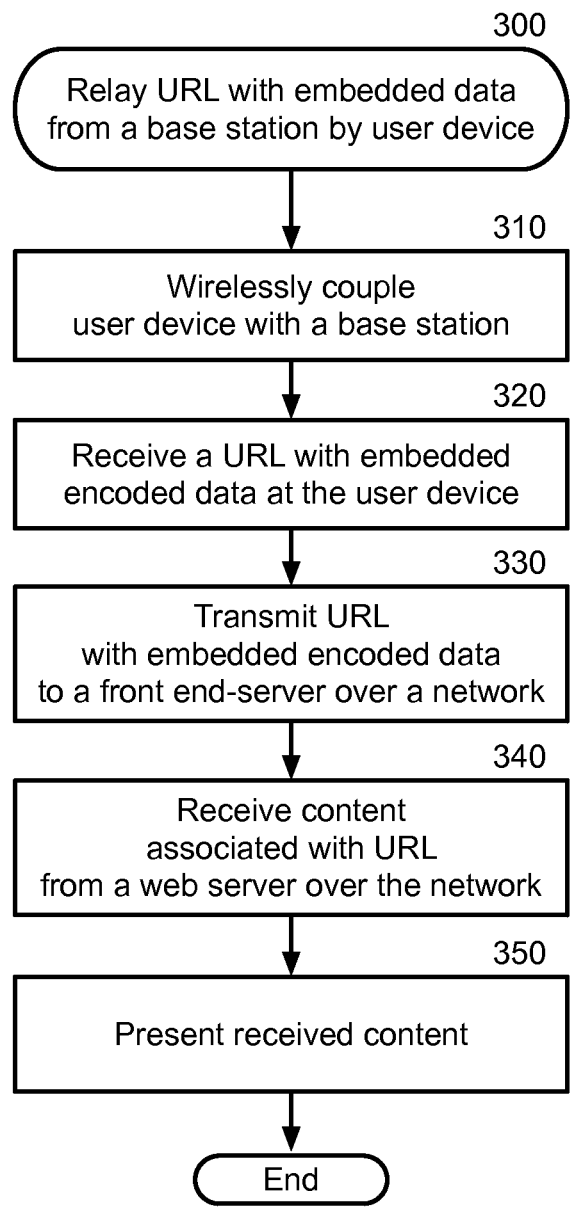
FIG. 3 is a block flow diagram depicting a method for relaying a URL with embedded data from a base station by user device, in accordance with certain exemplary embodiments.

FIG. 3 is a block flow diagram depicting a method 300 for relaying a URL with embedded data from a base station 110 by user device 120, in accordance with certain exemplary embodiments. The method 300 is described with reference to the components illustrated in FIG. 1.

In block 310, the base station 110 can wirelessly couple to the user device 120. The operations associated with this block may be the complement of operations associated with block 250 where the user device 120 can wirelessly couple to the base station 110. The coupling may employ NFC or some other wireless communication mechanism. It should be appreciated that other coupling mechanisms may be used aside from NFC. For example, optical, audio, visual, or other RF techniques may be used to communicate between the base station 110 and the user device 120.

In block 320, a URL with embedded encoded data may be received at the user device 120 from the base station 110. The URL may provide links to information desired by the user of the user device 120 along with embedded data from the base station 110 to be transmitted on to the front-end server 140 while retrieving the content related to the URL According to certain embodiments, it should be appreciated that an application associated with the user device 120 may receive the embedded data without that application necessarily being or being associated with a web browser. While a web browser associated with the user device 120 may typically process a delivered URL, other applications may handle the URL or the embedded data as well. For example, a URL may be pushed to the user device 120 through a wireless channel, optical channel, visibly coded as a bar code, or some similar transfer mechanism where an application associated with the user device 120 may be triggered to process the URL and embedded data at the user device 120 and onto the network 130.

In block 330, the URL with embedded encoded data may be transmitted to a front end-server 140 over a network 130 from the user device 120. The user device 120 may be configured to automatically transmit received URLs onto the network 130 to retrieve and display content associated with the URL from a web server 150. According to the technology discussed herein, this transmission may carry with it the embedded data from the base station 110. Even when loading the URL is not performed automatically, the user may manually open the URL within a browser. At that time, the URL will be transmitted to the front-end server 140 along with the embedded data.

In block 340, content associated with the URL may be received from a web server 150 over the network 130 at the user device 120. The user may be provided with information and media resources as expected from the links provided by the base station 110. This can occur without impact from the embedded data, which may be stripped from the URL before the URL is used to locate the actual resource to be returned by the web server 150 to the user device 120.

In block 350, the received content or resources from the web server 150 may be presented at the user device 120. As discussed with respect to block 340, the user's intent in receiving the URL from the base station 110 may be to retrieve this content from the web server 150. This intent also causes the embedded data to be communicated to the front-end server 140 without affecting the use case associated with the web server 150.

After block 350, the method 350 ends. Of course, the user device 120 can continue to access URLs, or other resources, received from the base station 110.

Figure 4:
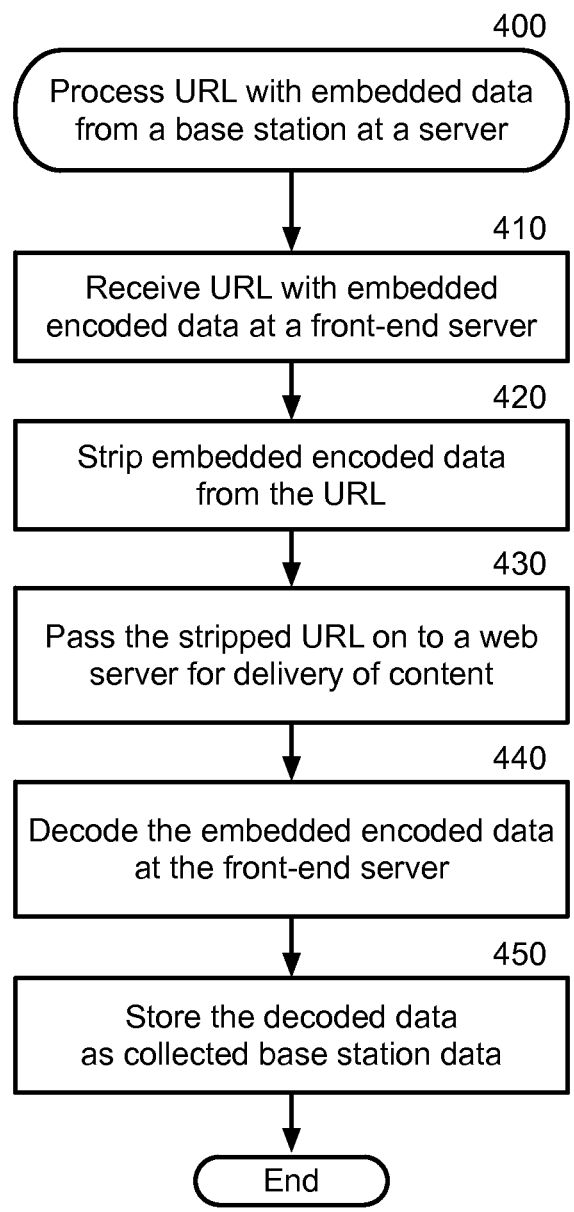
FIG. 4 is a block flow diagram depicting a method for processing a URL with embedded data from a base station at a server, in accordance with certain exemplary embodiments.

FIG. 4 is a block flow diagram depicting a method 400 for processing a URL with embedded data from a base station 110 at a server, in accordance with certain exemplary embodiments. The method 400 is described with reference to the components illustrated in FIG. 1.

In block 410, a front-end server 140 receives a URL from a user device 120 over a network 130. The URL may contain data that was encoded and embedded at a base station 110. Operations associated with this block 410 may compliment the operations of transmitting the URL from the user device 120 to a front end-server 140 over a network 130 as discussed with respect to block 330 of method 300.

It should be appreciated that while embedding data within a URL is used as an example throughout this disclosure, data to be transmitted may also be embedded into, or piggybacked onto, any other information provided to the user of the user device 120 for transmission onto the network 130. As such, other exemplary embodiments may use different information requests, resource locators, links, or messages than the URL example for embedding data from the base station 110 for transmission to the front-end server 140.

In block 420, the front-end server 140 can strip embedded data from the URL. The data may be that data embedded into the URL as discussed with respect to block 240 of method 200. Stripping the embedded data from the URL returns the URL to its original form before the data was embedded.

It should be appreciated that stripping the URL may also involve resolving redirection of the URL to the front-end server 140 from the original web server 150. For example, the URL may have been changed to a common address of the front-end sever 140. In such an instance, the address of the actual web sever 150 will need to be recovered into the stripped URL at the front-end server 140.

In block 430, the stripped URL is passed from the front-end server 140 on to a web server 150. The web sever 150 can then return the resources and content associated with the original URL to the user device 120. This content may be received at the user device 120 as discussed with respect to block 340 of method 300.

In block 440, the front-end server 140 can recover data originally collected at the base station 110 by decoding the embedded data stripped from the URL. This decoding can reverse the encoding operations discussed with respect to block 230 of method 200.

In block 450, the decoded data may be stored as collected base station data 160. According to some embodiments, multiple base stations 110 may use URLs pointing to the same front-end server 140. As such, the base station data 160 may represent data from multiple base stations 110.

After block 450, the method 400 ends. Of course, the front-end server 140 may continue to receive URLs with embedded data from one or more user devices 120.

General

One or more aspects of the invention may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing the invention in computer programming, and the invention should not be construed as limited to any one set of computer program instructions. Further, a skilled programmer would be able to write such a computer program to implement an embodiment of the disclosed invention based on the appended flow charts and associated description in the application text. Therefore, disclosure of a particular set of program code instructions is not considered necessary for an adequate understanding of how to make and use the invention. Further, those skilled in the art will appreciate that one or more aspects of the invention described herein may be performed by hardware, software, or a combination thereof, as may be embodied in one or more computing systems. Moreover, any reference to an act being performed by a computer should not be construed as being performed by a single computer as more than one computer may perform the act. The inventive functionality of the invention will be explained in more detail in the following description, read in conjunction with the figures illustrating the program flow.

The exemplary embodiments described herein can be used with computer hardware and software that perform the methods and processing functions described previously. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The exemplary methods and acts described in the embodiments presented previously are illustrative, and, in alternative embodiments, certain acts can be performed in a different order, in parallel with one another, omitted entirely, and/or combined between different exemplary embodiments, and/or certain additional acts can be performed, without departing from the scope and spirit of the invention. Accordingly, such alternative embodiments are included in the inventions described herein.

Although specific embodiments have been described above in detail, the description is merely for purposes of illustration. It should be appreciated, therefore, that many aspects described above are not intended as required or essential elements unless explicitly stated otherwise. Modifications of, and equivalent acts corresponding to, the disclosed aspects of the exemplary embodiments, in addition to those described above, can be made by a person of ordinary skill in the art, having the benefit of the present disclosure, without departing from the spirit and scope of the invention defined in the following claims, the scope of which is to be accorded the broadest interpretation so as to encompass such modifications and equivalent structures.

What is claimed is:

1. A computer-implemented method for collecting data from a base station, the method comprising:
    acquiring data at the base station;
    embedding the acquired data into a resource locator; and
    wirelessly transmitting the resource locator carrying the embedded data to a mobile device, wherein the mobile device relays the resource locator to a server for content retrieval to the mobile device, and a front-end server strips, decodes, and processes the embedded data from the resource locator.

2. The computer-implemented method of claim 1, wherein the base station is a Near Field Communication (NFC) station and the step of wirelessly transmitting the resource locator leverages NFC.

3. The computer-implemented method of claim 1, wherein the resource locator is a uniform resource locator (URL).

4. The computer-implemented method of claim 1, wherein the acquired data comprises environmental data from a sensor associated with the base station.

5. The computer-implemented method of claim 1, wherein the acquired data comprises operational data associated with the base station.

6. The computer-implemented method of claim 1, wherein content retrieval to the mobile device is followed by rendering the content on a display associated with the mobile device.

7. The computer-implemented method of claim 1, wherein the embedded data is transferred to the front-end server by the mobile device along with the primary use case of rendering content associated with the resource locator at the mobile device.

8. The computer-implemented method of claim 1, wherein content retrieval to the mobile device is followed by rendering the content on a display associated with the mobile device.

9. A computer program product, comprising:
    a non-transitory computer-readable storage medium having computer-readable program code embodied therein for collecting data from a base station, the computer-readable medium comprising computer-readable program code for:
    acquiring data at the base station;
    embedding, at the base station, the acquired data into a resource locator; and
    transmitting, from the base station, the resource locator carrying the embedded data to a mobile device
    receiving, in one or more computing devices associated with the transmitted resource locator and not otherwise in communication with the base station, the transmitted resource locator from the mobile device, and
    extracting, in the one or more computing devices, the acquired data from the received resource locator.

10. The computer program product of claim 9, wherein the base station is a Near Field Communication (NFC) station and the step of transmitting the resource locator leverages NFC.

11. The computer program product of claim 9, wherein the resource locator is a uniform resource locator (URL).

12. The computer program product of claim 9, wherein the acquired data comprises environmental data from a sensor associated with the base station.

13. The computer program product of claim 9, wherein the acquired data comprises operational data associated with the base station.

14. The computer program product of claim 9, wherein the embedded data is transferred to the front-end server by the mobile device along with the primary use case of rendering content associated with the resource locator at the mobile device.

15. The computer program product of claim 9, wherein the resource locator comprises a bar code.

16. The computer program product of claim 9, wherein the base station is a Near Field Communication (NFC) station and the step of transmitting the resource locator leverages NFC.

17. The computer program product of claim 9, wherein the resource locator is a uniform resource locator (URL).

18. The computer program product of claim 9, wherein the acquired data comprises environmental data from a sensor associated with the base station.

19. The computer program product of claim 9, wherein the acquired data comprises operational data associated with the base station.

20. A system for collecting data from a base station, the system comprising:
   the base station;
   a front-end server; and
   one or more software modules configured to:
      acquire data at the base station;
      embed the acquired data into a resource locator;
      transmit the resource locator to a mobile device using a near field communications protocol where the mobile device relays the resource locator to the front-end server;
      receive the resource locator at the front-end server from the mobile device; and
      extract, at the front-end server, the acquired data from the received resource locator.

* * * * *